March 20, 1962     D. K. BARNES     3,026,467
ELECTRIC POWER TRANSLATION SYSTEM
Filed Dec. 15, 1958     2 Sheets-Sheet 1

WITNESSES:
Bernard R. Giaquay
Clement L. McHale

INVENTOR
Donald K. Barnes
BY
F. E. Browder
ATTORNEY

March 20, 1962  D. K. BARNES  3,026,467
ELECTRIC POWER TRANSLATION SYSTEM
Filed Dec. 15, 1958  2 Sheets-Sheet 2

United States Patent Office 3,026,467
Patented Mar. 20, 1962

3,026,467
ELECTRIC POWER TRANSLATION SYSTEM
Donald K. Barnes, Sharon, Pa., assignor to Westinghouse Electric Corporation, East Pittsburgh, Pa., a corporation of Pennsylvania
Filed Dec. 15, 1958, Ser. No. 780,543
10 Claims. (Cl. 321—5)

This invention relates to electric power translation systems of the type in which a plurality of asymmetrically-conducting devices are used to interchange power in one direction or the other between a first polyphase system and a second system which may be either a direct-current system or an alternating-current system having a frequency which is different from the first polyphase system.

It has been found that the maximum current rating of certain asymmetrically-conducting devices, such as semi-conductor rectifiers and large ignitrons in certain applications is determined more by the peak current to which they are subjected under fault conditions rather than by the average current carried by each of such devices under normal conditions. In electric power translation systems, such as rectifier circuits, including transformer means and a plurality of asymmetrically-conducting devices of the type described, it is therefore desirable that said devices be subjected to a lower peak current under fault conditions in order to take greater advantage of the current carrying capacity of such devices. It is also desirable to improve the ripple factor of the output of such a system and to increase the utilization of the windings included in the transformer means which forms part of such a system.

One conventional electric power translation system, specifically a twelve-phase rectifier circuit, employs a rectifier transformer including a Y-connected secondary winding and a delta-connected secondary winding both inductively coupled to a common primary winding which may comprise several winding sections.

The latter system, being of the double-way type, has the inherent advantage over a comparable single-way system of greater utilization of the windings of the rectifier transformer included in said system. One disadvantage, however, of the latter conventional system is that the windings of the transformer included in the system are wound and insulated as if for two individual transformers which are assembled on a common magnetic core and finally interconnected. A second disadvantage of the latter conventional system is that it is often difficult to provide delta-connected and Y-connected secondary windings on the transformer included in said system having output voltages which are substantially equal in magnitude. It is, therefore, desirable that an electric power translation system, specifically a twelve phase rectifier circuit, be provided in which the ripple factor of the output of the system is improved, greater utilization is made of the windings of the transformer included in the system without the usual difficulty in providing equal voltages on different output windings of said transformer, and in which the asymmetrically-conducting devices included in said system are subjected to a lower peak current under fault conditions.

It is an object of this invention to provide a new and improved electric power translation system.

Another object of this invention is to provide a new and improved electric power translation system including a transformer means and a plurality of asymmetrically-conducting devices which are interconnected with said transformer means.

Another object of this invention is to provide a new and improved electric power translation system including a plurality of asymmetrically-conducting devices which are each subjected to a lower fault current.

A further object of this invention is to provide a twelve-phase rectifier circuit, including transformer means and a plurality of asymmetrically-conducting devices, in which the windings of said transformer means are utilized to a greater degree provided by the output windings of said transformer means and in which are substantially the voltages equal in magnitude.

A more specific object of this invention is to provide a twelve-phase, multiple, double, zig-zag, double-way circuit connection between a transformer means and a plurality of asymmetrically-conducting devices of a type in which the current rating is determined more by the peak current under fault conditions than by the average current carried by each of said devices in order to take greater advantage of the current carrying capacity of said asymmetrically-conducting devices.

Other objects of the invention will, in part, be obvious and will, in part, appear hereinafter.

For a fuller understanding of the nature and objects of the invention, reference should be had to the following detailed description, taken in connection with the accompanying drawings, in which.

Figure 1:
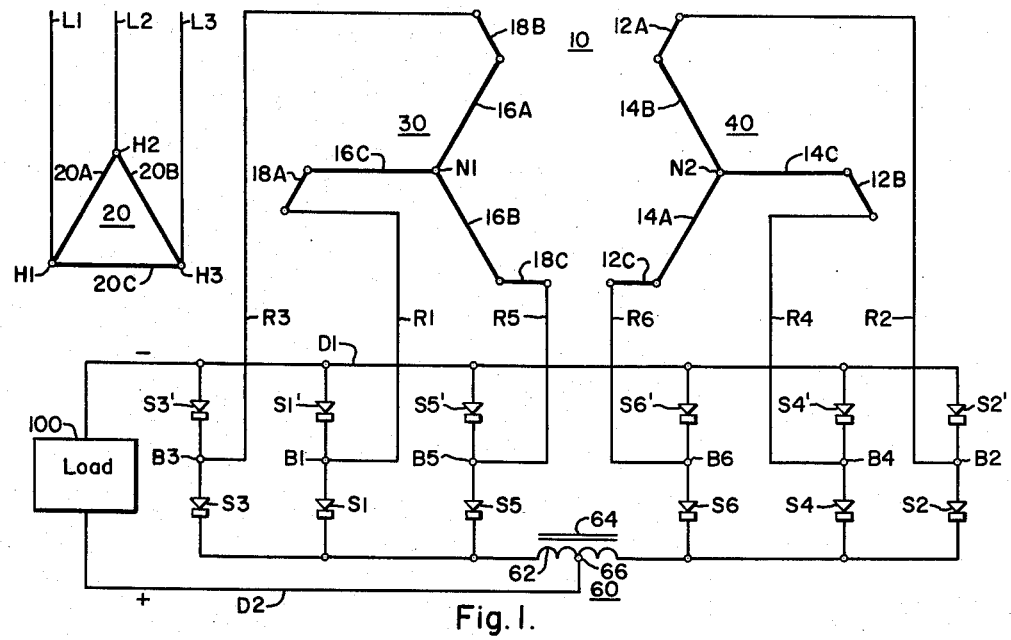
FIGURE 1 is a schematic diagram of one embodiment of this invention.

Referring now to the drawings and FIG. 1 in particular, there is illustrated an electric power translation system of the type in which power is taken from a three-phase power supply system, including the power leads L1, L2 and L3, and is transmitted through a plurality of asymmetricaly-conducting devices to a unidirectional current circuit having the power leads D1 and D2. The invention will be described as if the power is transferred from the three-phase power leads L1, L2 and L3 to the unidirectional current power leads D1 and D2, but it is to be understood that by the use of well-known inverter control connections, the direction of power flow could be reversed. The unidirectional current power leads D1 and D2 will be described, therefore, as if they were a direct-current power system which receives power from the three-phase alternating-current power system at L1, L2 and L3, but it is to be understood that the unidirectional current power leads at D1, D2 could be connected instead to one phase (or the phase) of a second different frequency alternating-current system which receives power from or which transmits power to the three-phase system at L1, L2 and L3, provided that suitable and well-known changes in the circuit connections are made.

The plurality of asymmetrically-conducting devices is illustrated as comprising twelve semiconductor rectifying devices S1 through S6 and S1' through S6', which may be taken to be broadly representative of twelve, single-phase, asymmetrically-conducting devices of a type in which the rating of each device is determined more by its peak current under fault conditions than by its average current.

The transformer means which is provided as part of the translation system comprises a rectifier transformer 10. The transformer 10 may comprise a polyphase transformer, as shown, or three separate single-phase transformers. In general, the transformer 10 is connected between the three-phase power supply system at the power leads L1, L2 and L3 and the rectifier leads R1 through R6 to apply twelve-phase, alternating-current electric power to the semiconductor rectifying devices S1 through S6 and S1′ through S6′. The transformer 10 includes a primary winding 20 and two polyphase secondary windings 30 and 40 which are both inductively disposed with respect to the primary winding 20. The three-phase primary winding 20 includes three individual phase windings 20A, 20B and 20C connected in a delta arrangement, the three-phase power supply system at L1, L2 and L3 being connected at the primary winding terminals H1, H2 and H3, respectively. The secondary winding 30 includes three individual phase windings, the individual phase windings including the first and second winding portions 18A and 16C, 18B and 16A, and 18C and 16B, respectively. The individual phase windings of the secondary winding 30 are each connected at one end to a common neutral point N1. Similarly, the other secondary winding 40 includes three individual phase windings, each of said phase windings comprising first and second winding portions 12A and 14B, 12C and 14A, and 12B and 14C, respectively. The first and second winding portions of each of the phase windings of the secondary windings 30 and 40 are connected in a zig-zag connection in order to shift the output voltages of each of the secondary windings 30 and 40 by a predetermined phase angle, preferably a phase angle of substantially 15°, in opposite directions with respect to the three-phase voltage at the power leads L1, L2 and L3. The latter phase shift or rotation is obtained by suitably proportioning the relative number of turns of each of the first winding portions 18A, 18B, 18C, 12A, 12B and 12C which each have fewer turns than the associated second winding portions 16C, 16A, 16B, 14B, 14C and 14A, respectively.

Each of the phase windings of the secondary windings 30 and 40 includes a main winding portion which is responsive to one of the primary phase windings of the primary winding 20 and a smaller winding portion which is responsive to a second phase winding of the primary winding 20. For example, the second winding portion 16C of one of the phase windings of the secondary winding 30 is responsive to the voltage across the phase winding 20C of the primary winding 20 and the voltage across the associated first winding portion 18A is responsive to the voltage across the phase winding 20A of the primary winding 20. The latter zig-zag connection produces a resultant voltage between the neutral point of the secondary winding 30 and the rectifier lead R1 which is displaced in phase from the voltage in the main winding portion 16C by a phase angle of substantially 15° in a counterclockwise direction. Similarly, the resultant voltage between the neutral point N2 of the secondary winding 40 and the rectifier lead R4 is displaced in phase from the voltage in the main winding portion 14C of the secondary winding 40 by a phase angle of substantially 15° in a clockwise direction. In general, the output voltages of the secondary windings 30 and 40 are therefore displaced in phase from each other by a total phase angle of substantially 30°. Since the secondary windings 30 and 40 are connected to the associated pluralities of semiconductor rectifier units S1 through S6 and S1′ through S6′, respectively, in a double-way connection, twelve rectifier phase voltages result at the unidirectional current power leads D1 and D2 to which are connected a load as indicated at 100.

The outer ends of the phase windings of the secondary winding 30 are connected through the rectifier leads R3, R1 and R5 to the bridge terminals B3, B1 and B5, respectively, between the pairs of semiconductor rectifiers S3′ and S3, S1′ and S1, and S5′ and S5, respectively. The other side of each of the semiconductor rectifying devices S3′, S1′ and S5′ are connected to the negative conductor D1 of the direct-current system. The other side of each of the rectifying devices S3, S1 and S5 are connected to the positive conductor D2 of the direct-current system through the interphase reactance means 60 whose purpose will be discussed hereinafter. Similarly, the outer ends of each of the phase windings of the secondary winding 40 are connected through the rectifier leads R6, R4 and R2 to the bridge terminals B6, B4 and B2 between the pairs of semiconductor rectifying devices S6′ and S6, S4′ and S4, and S2′ and S2, respectively. The other side of each of the rectifying devices S6′, S4′, S2′ are connected to the negative conductor D1 and the other side of each of the rectifying devices S6, S4 and S2 are connected to the positive conductor D2 of the direct-current system through the interphase reactance means 60. It is to be noted that the double-way or bridge type connections between the secondary windings 30 and 40 and the semiconductor rectifying devices S1 and S6 through S1′ and S6′ result in twelve-phase rectifier operation, since in a double-way circuit, the resultant unidirectional output voltage wave is composed of both positive and negative portions of the same secondary voltages rather than only the positive portions as in a conventional single-way rectifier circuit. In other words, as will be explained hereinafter, current flows through the phase windings of said secondary windings in opposite directions at different times during the operation of the over-all system which results in increased utilization of the windings of the transformer 10.

In common with other polyphase rectifier systems, the rectifier connections described above are such that different rectifier phases which are energized by the instantaneous voltages of different phases of the polyphase system are at times operated in parallel with each other so as to simultaneously supply power to or receive power from the same unidirectional current power circuit or bus. As is will known in the art, it is therefore necessary to provide a suitable interphase transformer or reactance means 60. The interphase reactance means 60 is represented as comprising a winding 62 having a mid-tap 66 and being disposed on a magnetic core 64. One side of the winding 62 is connected to the lower side or terminal of each of the rectifying devices S1, S3 and S5 and the other end of the winding 62 is connected to the lower side or terminal of each of the rectifying devices S6, S4 and S2. The mid-tap 66 of the winding 62 is connected to the positive conductor D2 of the unidirectional current system. The interphase reactance 60 is provided to develop the instantaneous voltage differences which are necessary to permit the parallel operation of two or more rectifier phases having terminal voltages which do not reach their peaks at the same instant and yet allow independent operation of the parallel rectifier phases. In other words, the interphase reactance 60 is capable of absorbing or developing the necessary alternating-current voltage differences or ripply voltage to permit the parallel operation of a plurality of rectifier phases. The invention is not limited to the particular interphase reactance 60, which was chosen for illustration, as there are many other kinds of interphase reactance means.

It is to be understood that the invention is not limited to a system having the interphase reactance connected to the positive conductor of the unidirectional system, as it may be connected to the negative conductor rather than to the positive conductor as illustrated. The interphase reactance 60 is designed for the sixth harmonic of the fundamental frequency of the three-phase power supply system at L1, L2 and L3.

In general, the connection described above between the rectifier transformer 10, the rectifier leads R1 through R6 and the semiconductor rectifying devices S1 through S6 and S1′ through S6′ may be described as a delta, twelve-phase, multiple, double zig-zag, double-way circuit connection. It is to be understood that the circuit disclosed may also be employed with a Y connection on the primary winding of the rectifier transformer 10, rather than a delta connection as illustrated. As previously described, the zig-zag connection in each of the phase windings of the secondary windings 30 and 40 of the transformer 10 produces across said secondary windings two sets of six-rectifier phase voltages each separated from the other by substantially 30°. Since six biphase voltages are obtained by the delta, twelve-phase, multiple, double zig-zag, double-way connection, twelve-phase rectifier operation may be provided by connecting the outer ends of each of the phase windings of the secondary windings 30 and 40 of the transformer 10 through one of the rectifier leads R1 through R6 to one pair of the semiconductor rectifying devices S1′ through S6′ and S1 through S6, respectively, in a double-way or bridge-type arrangement.

The operation of the secondary winding 30 and the associated semiconductor rectifying devices S3′, S1′, S5′, S3, S1 and S5 in the delta, twelve-phase multiple double zig-zag, double-way connection will now be considered. Because of the double-way or bridge-type connection of the secondary winding 30 of the transformer 10 through the rectifier leads R3, R1 and R5 to the bridge terminals B3, B1 and B5, respectively, between the pairs of rectifying devices S3′ and S3, S1′ and S1, and S5′ and S5, respectively, under ideal conditions, which ignore overlapping conduction periods, two of the latter rectifying devices will be operating in series at any given instant of each voltage cycle of the three-phase power system at L1, L2 and L3. In general, each of the latter rectifying devices operates for substantially 120° of each voltage cycle of the three-phase power system at L1, L2 and L3.

In particular, if it is assumed initially that current is flowing from the neutral point N1 in the secondary winding 30 out of the rectifier lead R1 from the phase winding which includes the winding portions 18A and 16C, current will flow for substantially 60 electrical degrees during the first portion of the operating cycle through the rectifier lead R1 to the terminal B1, through the rectifying device S1, through the interphase reactance means 60 to the positive conductor D2, through the load 100 to the negative conductor D1, through the rectifying device S3′ to the rectifier lead R3 and back to the neutral point N1 through the winding portions 18B and 16A. During the next 60 degrees, current will follow the same path from the rectifier lead R1 until it reaches the negative conductor D1 and then return to the neutral point N1 through the rectifying device S5′, the rectifier lead R5 and the winding portions 18C and 16B. During the following 60 degrees, current will flow from the neutral point N1, through the winding portions 16A and 18B to the terminal B3, through the rectifier lead R3, then through the rectifying device S3 and the interphase reactance 60 to the positive conductor D2, through the load 100 to the negative conductor D1 and back to the neutral point N1 through the rectifying device S5′, the rectifier lead R5 and the winding portions 18C and 16B. Current will then flow for substantially 60 degrees along the path just described from the rectifier lead R3 until it reaches the negative conductor D1 where the return path back to the neutral point N1 will be through the rectifying device S1′, the rectifier lead R1 and the winding portions 18A and 16C. Current will then flow for the next 60 degrees from the neutral point N1 through the winding portions 16B and 18C and the rectifier lead R5 to the terminal B5, through the rectifying device S5 and the interphase reactance 60, through the load 100 to the negative conductor D1, then back to the neutral point N1 through the rectifying device S1, the rectifier lead R1 and the winding portion 18A and 16C. During the final 60° of each cycle of operation, current will flow along the path just traced from the rectifier lead R5 to the negative conductor D1, and then return to the neutral point N1 through the rectifying device S3′, the rectifier lead R3 and the winding portions 18B and 16A. It is to be noted that current flows from the respective phase windings of the secondary winding 30 in sequence for substantially 120° of each voltage cycle of the three-phase power system at L1, L2 and L3.

The secondary winding 40 operates in similar fashion to the secondary winding 30 except that the current flow from the different phase windings of the secondary winding 40 is substantially 30° out-of-phase with the current flow from the phase windings of the secondary winding 30. Current flows in a sequential manner from the secondary winding 40 through each of the rectifier leads R2, R4 and R6 for substantially 120° of each voltage cycle of the three-phase power system L1, L2 and L3. For example, current starts to flow from the rectifier lead R2 substantially 90° after current starts to flow from the rectifier lead R1. Current starts to flow from the rectifier lead R4 30° before current starts to flow from the rectifier lead R5 and finally current starts to flow from the rectifier lead R6 substantially 30° before current starts to flow from the rectifier lead R1.

In summary, the delta, twelve-phase, multiple, double zig-zag, double-way rectifier circuit operates with two rectifier phases in parallel at all times. Each rectifier phase includes two semiconductor rectifying devices in series as just described and one rectifier phase is connected to each of the secondary windings 30 and 40 at any particular instant, in accordance with the phase sequence as indicated by the rectifier leads R1 through R6 for twelve-phase, double-way, rectifier operation. It is to be noted that the path of the output current of the rectifier system disclosed changed substantially every 60 degrees in a symmetrical manner as required for twelve-phase rectifier operation. As previously mentioned, the interphase reactance means 60 develops or absorbs the instantaneous voltage differences which are necessary to permit at least two of the twelve rectifier phases to operate effectively and independently in parallel.

It has been found that a twelve-phase, multiple double zig-zag, double-way rectifier circuit as disclosed subjects the asymmetrically-conducting devices included in the over-all system to a lower fault current which permits greater advantage to be taken of the current-carrying capacity of said devices of a type in which the rating is determined more by the peak current under fault conditions than by the average current or thermal rating of such devices. It is also to be noted that the twelve-phase circuit disclosed has an inherent advantage in limiting the peak current under fault conditions which is applied to the asymmetrically-conducting devices in such a circuit since the reactive voltage drop is approximately half the reactive drop of a corresponding six-phase circuit having the same internal reactance characteristic. Since in a rectifier circuit employing semi-conductor rectifying devices, the reactive drop is in most significant factor controlling the regulation of the over-all circuit, it is clear that the reactance of a twelve-phase, rectifier transformer as disclosed will be approximately twice that of a similar six-phase rectifier for the same over-all regulation of said circuit. Because the twelve-phase rectifier transformer disclosed will have approximately twice the reactance of a similar six-phase rectifier transformer for the same regulation, the fault current to which the associated rectifying devices are subjected during operation will be reduced to approximately half the magnitude associated with the six-phase rectifier transformer.

Figure 2:
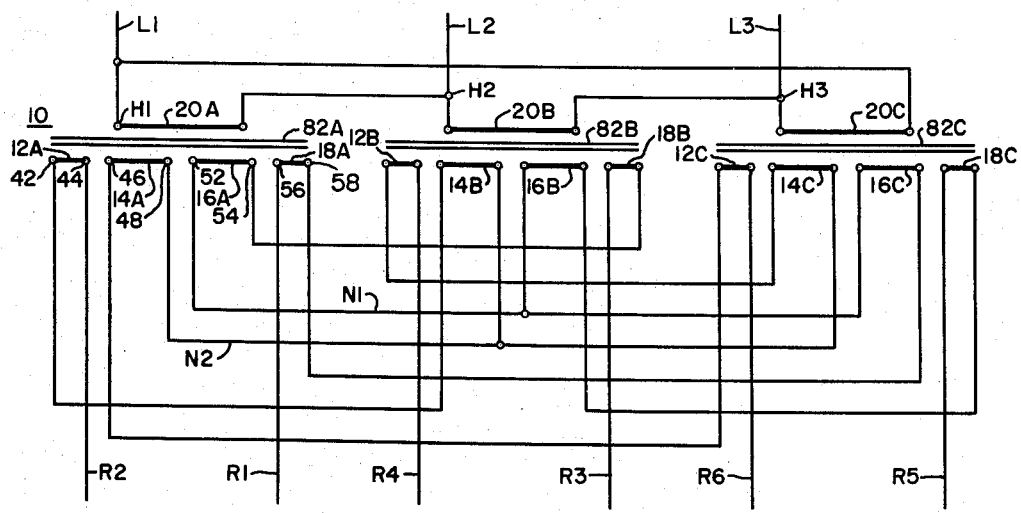
FIG. 2 is a schematic diagram illustrating the interconnection of the windings of the transformer included in FIG. 1.

Referring to FIG. 2, the manner in which the different windings of the transformer 10 are arranged and interconnected is illustrated. The primary phase windings 20A, 20B and 20C are delta connected to the three-phase power system at the power leads L1, L2 and L3 and each disposed on an associated magnetic core structure 82A, 82B and 82C, respectively, which may be combined in a particular application in a single overall magnetic core structure. The secondary winding portions 12A, 14A, 16A and 18A are all inductively disposed on the magnetic core 82A to be responsive to the voltage across the primary phase voltage 20A. Similarly, the secondary winding portions 12B, 14B, 16B and 18B are inductively disposed on the magnetic core 82B to be responsive to the voltage across the primary phase winding 20B.

Finally, the secondary winding portions 12C, 14C, 16C and 18C are similarly inductively disposed on the magnetic core 82C to be responsive to the voltage across the primary phase winding 20C. The left end of the secondary winding portion 16A at the terminal 52 and the left ends of each of the secondary winding portions 16B and 16C are connected to the common neutral point N1. Similarly, the right end of the secondary winding portion 14A, as indicated at the terminal 48, and the right ends of each of the secondary winding portions 14B and 14C are connected to the common neutral point N2 of the secondary winding 40, as shown in FIG. 1. The second winding portions 14A, 16A, 14B, 16B, 14C and 16C are each connected in series in a zig-zag connection to the associated first winding portions 12C, 18B, 12A, 18C, 12B and 18A to the rectifier leads R6, R3, R2, R5, R4 and R1, respectively. As previously mentioned, each of the phase windings of the secondary windings 30 and 40 includes two winding portions which are each responsive to different primary phase windings of the primary winding 20 of the transformer 10, as shown in FIG. 2.

Figure 3:
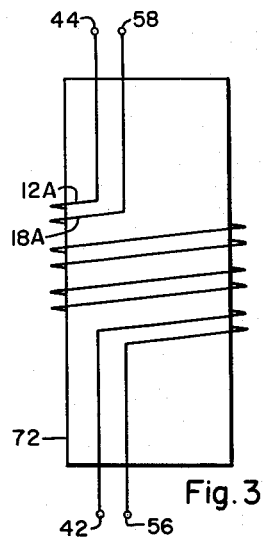
FIGS. 3 and 4 are diagrammatic representations of some of the windings of the transformer included in FIG. 1.

Referring to FIG. 3, there is illustrated the physical arrangement of the first winding portions 12A and 18A, which are responsive to the primary phase winding 20A. The first winding portions 12A and 18A are each connected between the terminals 44 and 42 and 56 and 58, respectively, which correspond to the terminal references for said winding portions shown in FIG. 2. The winding portions 12A and 18A each includes a plurality of turns which are interwound around a portion of the magnetic core 82A indicated schematically in FIG. 2 being preferably interwound helically about an insulating and supporting member 72 which may be disposed between said winding portions and the associated magnetic core 82A.

Figure 4:
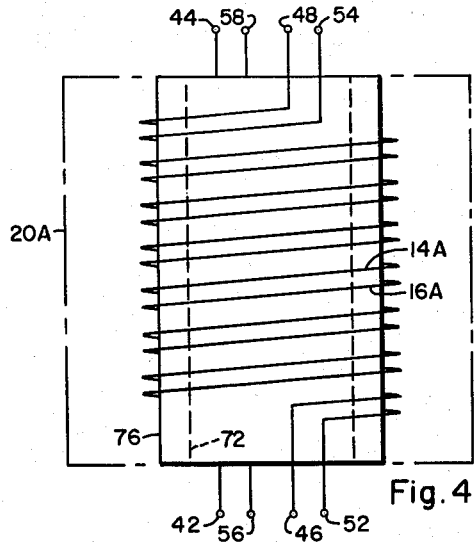

Referring to FIG. 4, the second winding portions 14A and 16A which are responsive to the same primary phase winding 20A as the first winding portions 12A and 18A also include a plurality of turns which are interwound helically about a portion of the magnetic core 82A, preferably on an insulating and supporting member 76 which is disposed to be concentric with the insulating and supporting member 72. The associated primary phase winding 20A may be of any conventional type, such as the pancake or disc-type winding and disposed concentrically with respect to the first and second winding portions 12A and 18A and 16A and 14A respectively. The primary phase winding 20A is indicated in dotted outline in FIG. 2. The other phase windings of the transformer 10 would be arranged similarly to those shown in FIGS. 3 and 4.

Since each pair of the winding portions 12A and 18A and 14A and 16A is interwound and concentrically disposed with respect to the primary phase winding 20A, the magnetic coupling between the windings of each pair and the associated primary phase winding 20A is substantially equalized or balanced. Therefore, the reactance between each of the winding portions 12A and 18A and the primary phase winding 20A and the reactances between each of the winding portions 14A and 16A and said primary phase winding are substantially equal. Since the other secondary winding portions are responsive to the other primary phase windings 20B and 20C, it is clear that the reactance between each of the over-all secondary windings 30 and 40 and the associated primary winding 20 will be substantially equal also. The transformer winding construction disclosed thus overcomes the problem of balancing the reactances which arises in a conventional transformer of the type which includes delta-connected and Y-connected secondary windings which are both responsive to a single primary winding or to different portions of a single over-all primary winding. It is to be noted also that the winding construction shown in FIGS. 3 and 4 also simplifies the requirements of the insulation which must be provided between the different winding portions of the primary and secondary windings compared to a conventional rectifier transformer included in a twelve-phase, double-way circuit of the type described which is constructed effectively as two individual transformers with windings disposed on a common magnetic core.

Figure 5:
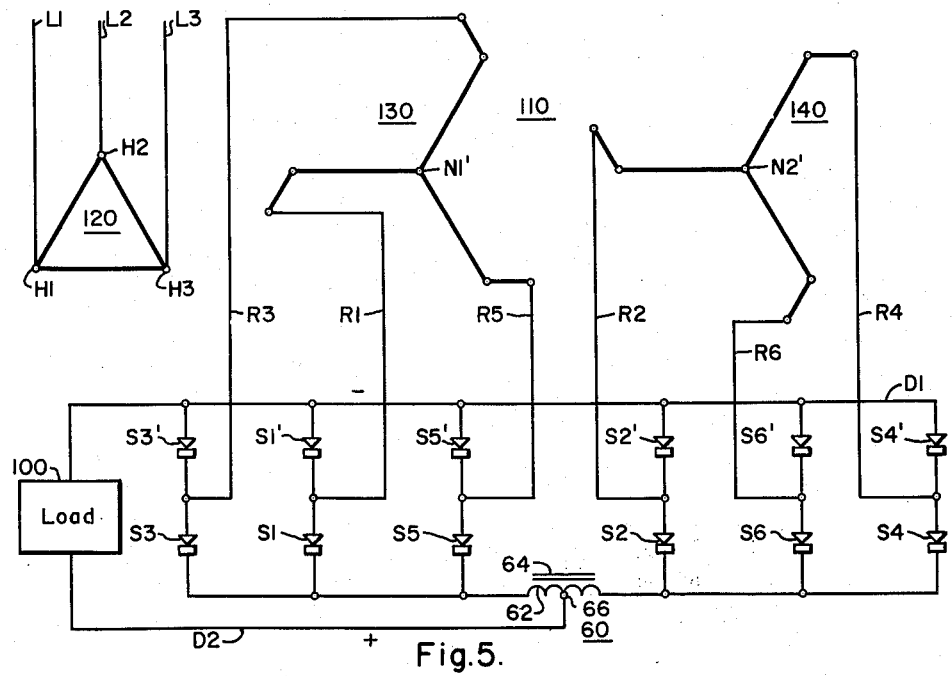
FIG. 5 is a schematic diagram showing a second embodiment of this invention.

Referring now to FIG. 5, there is illustrated a second embodiment of the invention which is similar to the translation system shown in FIG. 1, except for the transformer means, specifically the rectifier transformer 110 which is substituted for the transformer 10 shown in FIG. 1. In general, the transformer 110 is similar to the transformer 10 except for the manner in which the required phase shifts are obtained in the secondary windings 130 and 140 of the transformer 110.

In particular, the transformer 110 includes a primary winding 120 which is substantially identical with the primary winding 20 of the transformer 10 shown in FIG. 1 and is similarly connected to a three-phase power system at the power leads L1, L2 and L3. The transformer 110 also includes two polyphase secondary windings 130 and 140 which each include three phase windings which are each zig-zag connected to shift the output voltages of each of said secondary windings by a predetermined phase angle, preferably an angle of substantially 15°, in opposite directions with respect to the voltage at the three-phase power leads L1, L2 and L3. The secondary winding 130 is substantially identical to the secondary winding 30 of the transformer 10 and includes a common neutral point N1'. The polyphase output voltage of the secondary winding 130 is shifted or rotated by a phase angle of substantially 15° in a counterclockwise direction with respect to the voltage at the three-phase power leads L1, L2 and L3. The secondary winding 140 is similar to the secondary winding 40 of the transformer 10 and the phase windings of the secondary winding 140 are similarly arranged to shift the output voltage of the secondary winding 140 by a phase angle of substantially 15° in a clockwise direction with respect to the voltage at the three-phase power leads L1, L2 and L3. Otherwise, the translation system or rectifier circuit shown in FIG. 5 is substantially identical to the translation system shown in FIG. 1 and the operation of said rectifier circuit is substantially or effectively the same as that previously described for the rectifier circuit shown in FIG. 1 since the unidirectional output voltage of said circuit is identical with the unidirectional output voltage of the rectifier circuit shown in FIG. 1.

The arrangement of the windings, the interconnections of said windings, and the physical construction of the transformer 110 are substantially the same as the transformer 10 except for the changes in the interconnections of said windings. The embodiment of the invention shown in FIG. 1 is preferred since the interconnections of the secondary winding portions of the transformer 10 would be slightly less complicated than the interconnections of the secondary winding portions of the transformer 110 shown in FIG. 5.

In FIGS. 1 and 5, the asymmetrically-conducting devices are shown by means of a conventional rectifier symbol which is intended to be applicable to any kind of asymmetrically-conducting device. In carrying out this invention, however, it is contemplated that each individual asymetrically-conducting device shall be of a type in which the rating is determined more by the fault current rather than by the average current or thermal capacity of the asymmetrically conducting device. Two examples of such asymmetrically-conducting devices are the ignitron in certain applications and any of the large number of semiconductor rectifying devices such as those of the silicon or germanium type, and our invention shall be understood as including the use of either one of these two general types of asymmetrically-conducting devices.

The apparatus and circuits embodying the teachings of this invention have several advantages. For example, the asymmetrically-conducting devices included in a translation system as disclosed are subjected to a lower fault current to take greater advantage of the current-carrying capactiy of such devices. This means that the number of asymmetrically-conducting devices, particularly those of the semiconductor rectifier type, may be reduced as compared to certain conventional rectifier circuits in which such devices are often provided in parallel-connected groups in order to avoid the failure of such devices during fault conditions. Another advantage of the rectifier system disclosed is that the rectifier transformer included in said system may be constructed as a single transformer, rather than as two individual transformers having windings disposed on a common magnetic core with the insulation and associated physical problems of assembly inherent with the latter construction. Because the voltages of the two secondary windings of the disclosed system are always substantially equal in magnitude, the rectifier transformer included difficulties associated with obtaining equal voltage on the Y-connected and delta-connected secondary windings of a rectifier transformer included in a conventional twelve-phase double-way circuit are eliminated. The windings of a rectifier transformer in a system as disclosed are also utilized to a greater degree since current flows through said windings in both directions during substantially two-thirds of each cycle of operation. Finally, the advantages of improved ripple factor associated with twelve-phase rectifier operation are obtained while the reactance of the rectifier transformer is increased for a particular regulation characteristic to minimize the peak current under fault conditions to which the associated asymmetrically conducting devices are subjected.

Since numerous changes may be made in the above-described apparatus and circuits and different embodiments of the invention may be made without departing from the spirit thereof, it is intended that all the matter contained in the foregoing description or shown in the accompanying drawings shall be interpreted as illustrative and not in a limiting sense.

I claim as my invention:

1. In an electric power translation system, the combination comprising, unidirectional current power leads, three-phase power leads, transformer means including a three-phase primary winding delta-connected to said three-phase power leads and two three-phase secondary windings, said secondary windings each being zig-zag connected to shift the output voltages of said secondary windings by a phase angle of substantially 15° in opposite directions with respect to said three-phase power leads, a plurality of separate, single-phase, semiconductor rectifying devices, a delta, twelve-phase, multiple, double zig-zag, double-way circuit connection for connecting said devices between said unidirectional leads and said transformer means, and interphase reactance means connected in circuit relation with said devices and said transformer means for absorbing the instantaneous voltage differences necessary to permit a portion of said devices to operate in parallel at all times.

2. In an electric power translation system, the combination comprising, unidirectional current power leads, three-phase power leads, transformer means including a three-phase primary winding delta-connected to said three-phase power leads and two three-phase secondary windings inductively disposed on a common magnetic core, each phase of said secondary windings comprising first and second winding portions each having a plurality of turns and being zig-zag connected to shift the output voltage of each of said secondary windings by a phase angle of substantially 15° in opposite directions with respect to said three-phase power leads, the winding portions of said secondary windings being interwound in pairs about a portion of said core, a plurality of separate, single-phase semiconductor rectifying devices, a delta, twelve-phase, multiple, double zig-zag, double-way connection for operatively connecting said devices between said unidirectional current leads and said transformer means, and interphase reactance means connected in circuit relation with said devices and said transformer means for absorbing the instantaneous voltage differences necessary to permit a portion of said devices to operate in parallel at all times.

3. In an electric power translation system, the combination comprising, direct-current power leads, three-phase power leads, a plurality of asymmetrically-conducting devices of a type in which the maximum rating is determined more by the peak current under fault conditions than by the average current carried by each of said devices, transformer means including a three-phase primary winding delta-connected to said three-phase power leads and two three-phase secondary windings, said secondary windings each being zig-zag connected to shift the output voltage of each of said secondary windings by a phase angle of substantially 15° in opposite directions with respect to said three-phase power leads, a delta, twelve-phase, multiple, double zig-zag, double-way connection for operatively connecting said devices between said direct-current leads and said transformer means, and interphase reactance means connected in circuit relation with said devices and said transformer means for absorbing the instantaneous voltage differences necessary to permit a portion of said devices to operate in parallel at all times.

4. In an electric power translation system, the combination comprising, direct-current power leads, three-phase power leads, a plurality of asymmetrically-conducting devices of a type in which the maximum rating is determined more by the peak current under fault conditions than by the average current carried by each of said devices, transformer means including a three-phase primary winding delta connected to said three-phase power leads and two secondary windings inductively disposed on a common magnetic core, said secondary windings each comprising three phase windings, said phase windings each comprising first and second winding portions each having a plurality of turns and being zig-zag connected to shift the output voltages of said secondary windings by predetermined phase angles of 15° in opposite directions with respect to said three-phase power leads, the turns of said winding portions being interwound in groups of two about a portion of said core to substantially balance the reactances between said primary winding and each of said secondary windings, means for connecting said devices between said direct-current leads and said transformer means in a twelve-phase, multiple, double zig-zag, double-way connection and interphase reactance means connected in circuit relation with said devices and said transformer means for absorbing the instantaneous voltage differences necessary to permit a portion of said devices to operate in parallel at all times.

5. A transformer adapted for connection between three-phase power leads and a plurality of asymmetrically-conducting devices of a type in which the maximum rating is determined more by the peak current under fault conditions than by the average current carried by each of said devices comprising a delta connected three-phase primary winding and two secondary windings inductively disposed on a common magnetic core, said secondary windings each comprising three phase windings, said phase windings each comprising first and second winding portions each having a plurality of turns and being zig-zag connected to shift the output voltages of said secondary windings by predetermined phase angles of 15° in opposite directions with respect to said three-phase power leads, the turns of said winding portions being interwound in groups of two about a portion of said core to balance the reactances between said primary winding and each of said secondary windings, means for connecting said devices between said direct-current leads and said transformer means in a delta, twelve-phase, multiple, double zig-zag, double-way connection and interphase reactance means connected in circuit relation with said devices and said transformer means for absorbing the instantaneous voltage differences necessary to permit a portion of said devices to operate in parallel at all times.

6. In an electric power translation system, the combination comprising, direct-current power leads, three-phase power leads, a plurality of semiconductor rectifying devices, transformer means including a three-phase primary winding delta connected to said three-phase power leads and two secondary windings inductively disposed on a common magnetic core, said secondary windings each comprising three phase windings, said phase windings each comprising first and second winding portions each having a plurality of turns and being zig-zag connected to shift the output voltages of each of said secondary windings by a phase angle of substantially 15° in opposite directions with respect to said three-phase power leads, the turns of said winding portions being interwound in groups of two about a portion of said core to substantially balance the reactances between said primary winding and each of said secondary windings, means for connecting said devices between said direct-current leads and said transformer means in a delta, twelve-phase, multiple, double zig-zag, double-way connection and interphase reactance means connected in circuit relation with said devices and said transformer means for absorbing the instantaneous voltage differences necessary to permit a portion of said devices to operate in parallel at all times.

7. A transformer adapted for connection between three-phase power leads and a plurality of semiconductor rectifying devices, comprising a three-phase winding delta connected to said three-phase power leads and two secondary windings inductively disposed on a common magnetic core, said secondary windings each comprising three phase windings, each phase winding including first and second winding portions each having a plurality of turns and being zig-zag connected to shift the output voltages of said secondary windings by predetermined phase angles of 15° in opposite directions with respect to said three-phase power leads, said first winding portions each having fewer turns than the associated second winding portion, the turns of the respective winding portions of the corresponding phase windings of said secondary windings being interwound about a portion of said core and the turns of the second winding portions of the corresponding phase windings being interwound concentrically with respect to the associated first winding portions to substantially balance the reactances between said primary winding and each of said secondary windings.

8. In an electric power translation system, the combination comprising, direct-current power leads, three-phase power leads, a plurality of semiconductor rectifying devices, transformer means including a three-phase winding delta connected to said three-phase power leads and two secondary windings inductively disposed on a common magnetic core, said secondary windings each comprising three phase windings, each phase winding including first and second winding portions each having a plurality of turns and being zig-zag connected to shift the output voltages of each of said secondary windings by a predetermined phase angle of substantially 15° in opposite directions with respect to said three-phase power leads, said first winding portions each having fewer turns than the associated second winding portion, the turns of the respective winding portions of the corresponding phase windings of said secondary windings being interwound about a portion of said core and the turns of the second winding portions of the corresponding phase windings of said secondary windings being interwound concentrically with respect to the associated first winding portions to substantially balance the reactances between said primary winding and each of said secondary windings, means for connecting said devices between said direct-current leads and said transformer means in a delta, twelve-phase, multiple, double zig-zag, double-way connection and interphase reactance means connected in circuit relation with said devices and said transformer means for absorbing the instantaneous voltage differences necessary to permit a portion of said devices to operate in parallel at all times.

9. In an electric power translation system, the combination comprising, unidirectional current power leads, three-phase power leads, transformer means including a single three-phase primary winding connected to said three-phase power leads and two three-phase secondary windings, said secondary windings each being zig-zag connected to shift the output voltage of said secondary windings by substantially 15° in opposite directions with respect to said three-phase power leads, a plurality of separate, single-phase, semiconductor rectifying devices, a twelve-phase, multiple, double zig-zag, double-way circuit connection for connecting said devices between said unidirectional leads and said transformer means, and interphase reactance means connected in circuit relation with said devices and said transformer means for absorbing the instantaneous voltage differences necessary to permit a portion of said devices to operate in parallel at all times.

10. A transformer adapted for connection to three-phase power leads comprising a single three-phase primary winding delta-connected to said three-phase power leads and two three-phase secondary windings, said secondary windings each being inductively disposed with respect to said primary winding and zig-zag connected to shift the output voltage of each of said secondary windings by substantially 15° in opposite directions with respect to said three-phase power leads.

References Cited in the file of this patent

UNITED STATES PATENTS

| | | |
|---|---|---|
| 1,932,272 | Kaar | Oct. 24, 1933 |
| 2,428,014 | Curry et al. | Sept. 30, 1947 |
| 2,825,022 | Boyer et al. | Feb. 25, 1958 |

FOREIGN PATENTS

| | | |
|---|---|---|
| 857,516 | France | Apr. 15, 1940 |